April 29, 1969   R. G. MILLHISER   3,440,703
METHOD OF PREPARING METAL SEALING SURFACES
Original Filed Aug. 31, 1964
FIG.1
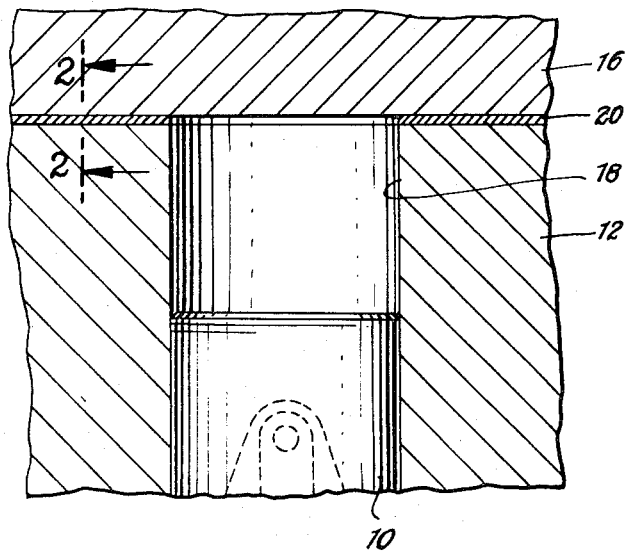
FIG.2
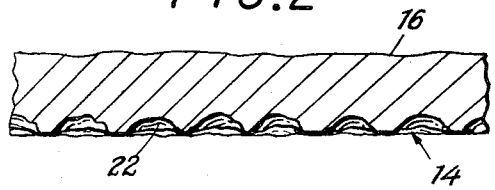
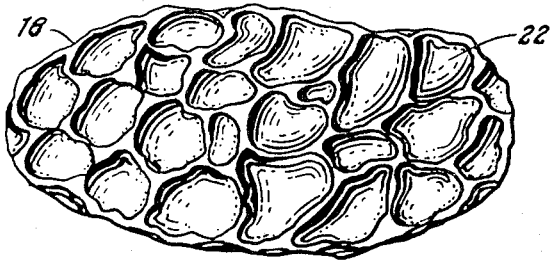
FIG.3
INVENTOR
ROBERT G. MILLHISER, United States Patent Office 3,440,703
Patented Apr. 29, 1969

3,440,703
METHOD OF PREPARING METAL SEALING SURFACES
Robert G. Millhiser, Detroit, Mich., assignor to Ajem Laboratories, Inc., Livonia, Mich.
Original application Aug. 31, 1964, Ser. No. 393,045, now Patent No. 3,314,684, dated Apr. 18, 1967. Divided and this application Dec. 21, 1966, Ser. No. 604,112
Int. Cl. B23p *15/00;* B24b *1/00;* B24c *1/00*
U.S. Cl. 29—156.4      7 Claims This is a divisional of application Ser. No. 393,045, filed Aug. 31, 1964, now Patent No. 3,314,684.

This invention relates to methods and articles resulting therefrom for creating greatly superior sealing surfaces, and more particularly for making a revolutionary kind of stationary gasket surface or sliding metal-to-metal sealing surface.

In prior applications for myself and my co-workers we have disclosed processes and apparatus for reforming and improving surfaces of various articles by impacting them with abrasive or shot-peening particles (which will be referred to herein as grit) accelerated to "surface reforming" velocities. Such processes and apparatus for performing them have been disclosed in a series of applications, e.g., Ser. No. 9,910, filed Feb. 19, 1960, Patent No. 3,150,-467, dated Sept. 29, 1964; Ser. No. 112,454, filed May 24, 1961, Patent 3,153,882 issued Oct. 27, 1964; Ser. No. 122,521, filed July 7, 1961, Patent No. 3,146,550, dated Sept. 1, 1964; Ser. No. 105,978, filed Apr. 27, 1961, Patent No. 3,160,989, issued Dec. 15, 1964; Ser. No. 176,084, filed Feb. 27, 1962, now abandoned.

We shall use the term "surface reforming" herein to include the various surface treatments by which a new surface is formed on a part, or one of its characteristics is changed in some respect from those of the part before such treatment. In other words, "surface reforming" which includes the actual removal of minute portions of surface material or an actual molecular alteration or crystalline rearrangement of such surface material. This surface reforming in the present invention includes bombardment of the surface with hard particles, i.e., grit including especially steel shot or short pieces of cut wire, sand, aluminum oxide, silicon carbide or the like, all of which are known to the art in general as grit for blasting treatment.

In finishing metal surfaces and the like for gasketing or other sealing purposes, it has been the general practice to prepare the surfaces by very fine cuts with machine tools, grind them with fine abrasives, e.g., grinding wheels or laps, or to lap or hone them with grinding compounds, for example, which consist of abrasives in liquid lubricant carriers. These former practices result in machine or grinding lines in the form of small to medium size grooves. These extended linear imperfections in the sealing surface generally occur multiply, often in a cross-hatch pattern, resulting in a series of escape paths in the form of minute grooves along which the compressed fluid can flow through a sealing joint. Often the gases escaping along these paths are quite corrosive and can cause progressive deterioration of the sealing joint with ultimate, even if not immediate, total failure of the seal. In the automotive industry, in order to overcome gasket failures in engine heads it has been found necessary to prepare the sealing surface with a series of increasingly fine cuts, first with a tool and then with a grinding wheel, necessitating a tedious and expensive procedure. With this procedure, the surface of the engine head had to be ground extremely smooth, e.g., with an aluminum engine head to a profilometer reading of between 10 to 20 microinches. In spite of such careful preparation the industry still experienced gasket failures.

According to the present invention, I have found the surprising result that it is not the microinch reading of roughness (which had heretofore been the criterion of sealing surface excellence) which was significant, but rather what I shall call the "surface texture" which is actually significant. I have found that by impinging grit under certain controlled conditions, preferably impelled by a liquid medium, against the proposed sealing surface, I can achieve superior seals even though the sealing surfaces have a microinch reading of two to four times what had formerly been thought possible, and even more. I believe that my success results from the obliteration of the irregular machine marks left in the original "roughing out" of the sealing surface. This obliteration by grit impingement apparently breaks up these linear imperfections, thereby blocking off potential paths of escape, by forming a substantially uniform surface having a multiplicity of contiguous shallow pits. These pits can serve a dual purpose depending upon the specific use to which the prepared sealing is to be put. For example, in a static seal the ridges formed between these pits bite into the opposing surface thereby giving a series of thousands of successive minute barriers across the sealing surface, thereby multiply blocking off any potential escape path. In the case where a plastic sealant or the like is employed, these pits present an irregular roughness which enhances the grip of the sealant onto the surface and enable it to better resist external pressures. In the case of sliding parts, these pits can similarly act as minute reservoirs of lubricant to maintain lubrication of the surface and to permit the ridges to seal in the same manner as indicated above.

Besides forming a multiplicity of pits by gouging or displacement, this grit impingement apparently also compacts the surface to close over and fill any machine grooves or other micro-fissures.

The surprising improvement in the operation of such devices which results from such treatment of these surfaces is not at present fully understood and therefore I cannot be bound by any theory. However, it appears from the evidence considered, that this is probably due to the foregoing explanations. The use of the aforementioned methods developed by myself and my co-workers on malleable surfaces, such as metal and certain plastics, to give a reformed surface having a multiplicity of contiguous shallow pits, have proven in actual tests in the field to give greatly improved sealing fitted surfaces, especially for holding fluid pressures as in cylinder heads, pipe flanges, and valve housings and/or sliding surfaces as in valves, pistons, and cylinders, etc.

In this specification and the accompanying drawings we have shown and described a preferred embodiment of our invention and have suggested various alternatives and modifications thereof; but it is to be understood that these are not intended to be exhaustive and that many other changes and modifications can be made within the scope of the invention. These suggestions herein are selected and included for purposes of illustration in order that others skilled in the art will more fully understand the invention and the principles thereof and will thus be enabled to modify it and embody it in a variety of forms, each as may be best suited to the conditions of a particular use.

In the accompanying drawings:

FIGURE 1 shows a side elevation and section of a piston and cylinder combination having a gasketed head, the walls of said cylinder and the opposing faces of the gasket portions of said head representing sealing surfaces according to the present invention;

FIGURE 2 illustrates a greatly enlarged schematically representational cross section of the gasket surface of the head shown in FIGURE 1, as though taken along line 2—2; and FIGURE 3 is a similar schematically representational enlarged side elevation of a portion of the cylinder wall.

The generalized piston 10 and the cylinder block 12 shown in FIGURE 1 illustrate an example of a possible use for the sealing surfaces of the present invention. FIGURE 1 could represent uses of this invention on such widely divergent apparatus as a portion of an aluminum automotive engine head or part of a precision pump.

Looking at the apparatus illustrated in FIGURE 1 as an internal combustion engine, one can see two different applications of the present invention, namely (1) as a static sealing surface on the gasket portion 14 of the engine head 16, and (2) as a sliding sealing surface on the cylinder wall 18 of the cylinder block 12.

The type of surface reforming required for the preparation of these desired sealing surfaces varies greatly according to the use to which it will be put. If an aluminum engine head gasket surface is to be prepared, then it has been found that a liquid impelled abrasive blast generated at a pressure of 115 p.s.i. and utilizing a 50-50 mixture of SAE No. 25 and SAE No. 40 grit and directed in a contained stream at a single angle of attack gives an extremely reliable seal when used with a standard thin steel sheet gasket 20. This treatment gives a uniformly pitted sealing surface having a microinch roughness reading of 40 to 60, which when seven samples were tested at full throttle, resulted in absolutely no failures. (See pits 22 schematically indicated in FIGURES 2 and 3.) This result was better than would be expected from normally prepared precision ground engine heads, and was obtained by independent automotive engineers who prior to testing would not believe that engine heads with such high microinch readings could function at all. However, engine heads are now being prepared for actual production using grit over twice as coarse, namely, SAE No. 16 grit, with an estimated microinch reading on the order of 120 to 150. The kind of grit most often employed is short pieces of chopped steel wire.

In contrast, these preferred high velocity liquid impelled abrasive blasts can employ a very fine grit for preparing a 5 to 10 microinch sealing surface giving greatly superior results when used, for example, in a precision pump having a 0.001 to 0.002 inch gasket, than would be obtained from a similar surface prepared by conventional means.

I have found that by using an abrasive grit other than sand, a grit which is denser and less likely to fracture, the surface is cut *and* compacted at the same time without requiring separate treatment which had originally appeared necessary.

A sealing surface according to the present invention should be pitted so as to be substantially contiguous. The more untreated plateaus remaining between pits, the less effective the seal. The pitting should be substantially uniform in the resulting ridges raised, though not necessarily in the size of the pits themselves. This is to ensure a good overall bite into the opposing seal face without any high ridges preventing the remainder from seating against the opposing face to establish the required series of highly multiplied minute barriers across the sealing joint. The range and degree of roughness required will depend upon the material used and the specific purpose for which it is designed. Thus the higher the pressures encountered, or the smaller the microinch readings required, the relatively more uniform the pitting should become.

It has become apparent that the relatively low pressure sand blasting normally practiced in prior art blasting techniques are not sufficient for the preparation of most sealing surfaces according to my invention. I find that much greater surface reforming energies are usually required than are generated by these earlier techniques.

It is also apparent that scattered blasting, as in an unconfined stream from a nozzle or from a slinger wheel or as in random spraying, tend to give inferior seals because of wide variations in pitting that result; probably due to a resulting wide variation of impingement speeds and angles of the individual particles, with the peripheral particles (the last to impinge on each portion of a surface) tending to groove rather than pit the surface.

I claim:
1. A process for manufacturing a seal for a joint between surfaces of adjoining parts which comprises providing the surfaces to interfit in gross conformity with each other over a substantial area, forming at least one of the surfaces with substantially continuous cuts, grit blasting said cut surface over at least a substantial portion of said interfitting area with kinetic energy sufficient to drive said grit particles against said surface with formation of substantially contiguous small pits with continuous relatively sharp barrier ridges therebetween and pressing said parts together to force said ridges against the interfitting surface to form a stationary seal therewith.

2. The process as claimed in claim 1 wherein said grit blasted surface is a metal surface.

3. The method of preparing a metal sealing surface which comprises forming a metal surface with substantially continuous cuts of a predetermined shape, and thereafter obliterating said surface cuts by high energy, uniform grit blasting of said surface at a substantially unitary angle to form substantially contiguous, small, independent pits having relatively sharp barrier ridges therebetween and giving said metal surface a roughness greater than that conventionally required for a surface prepared solely by substantially continuous cuts.

4. A process as claimed in claim 1 wherein said grit blasting results in a roughness in the range of about ten to two hundred microinches.

5. A process as claimed in claim 1 wherein said grit blasting results in a roughness in the range of about 40 to 150 microinches.

6. A process as claimed in claim 1 wherein one of said surfaces is an aluminum alloy.

7. A process as claimed in claim 1 wherein said grit blasted surface is an aluminum alloy and said opposing surface is steel.

References Cited

UNITED STATES PATENTS

| | | | |
|---|---|---|---|
| 2,248,530 | 7/1941 | Granger et al. | 51—320 X |
| 2,404,816 | 7/1946 | Snyder | 277—96 X |
| 2,422,431 | 6/1947 | Melrose | 51—320 |

FOREIGN PATENTS

| | | |
|---|---|---|
| 556,257 | 9/1943 | Great Britain. |

CHARLIE T. MOON, *Primary Examiner.*

U.S. Cl. X.R.

29—428, 529, 558; 51—320